United States Patent [19]
Abe et al.

[11] Patent Number: 5,587,060
[45] Date of Patent: Dec. 24, 1996

[54] METHOD OF REMOVING METAL CONTAINED IN SOLUTION

[75] Inventors: Naoki Abe, Okazaki; Koji Mizuno, Toyota; Masayuki Sumiyoshi, Okazaki; Katsuya Murakami, Toyota; Kojiro Murayama, Toyota; Koichi Sugiura, Toyota; Fumio Kawahara, Toyota; Mitsuru Tomono, Toyota; Heijiro Ojima, 7, Shimoshigehara-cho 4-chome, Kariya-shi, Aichi-ken, all of Japan

[73] Assignees: Toyota Jidosha Kabushiki Kaisha; MEC International Corporation, both of Toyota; Heijiro Ojima, Kariya, all of Japan

[21] Appl. No.: 527,206

[22] Filed: Sep. 12, 1995

[30] Foreign Application Priority Data

Sep. 13, 1994 [JP] Japan ............................ 6-219103
Aug. 11, 1995 [JP] Japan ............................ 7-205765
Aug. 28, 1995 [JP] Japan ............................ 7-218820

[51] Int. Cl.$^6$ ............................ B01D 17/06; C02F 1/48
[52] U.S. Cl. .................... 204/554; 204/558; 210/638; 210/702
[58] Field of Search ..................... 204/554, 571, 204/567, 573, DIG. 13, 558, 561; 205/750, 771, 702; 210/702, 708, 638

[56] References Cited

U.S. PATENT DOCUMENTS 4,909,944  3/1990  Jackson ........................... 210/674

FOREIGN PATENT DOCUMENTS 0582314  2/1994  European Pat. Off. .
2431995  2/1980  France .
2-274900 11/1990 Japan .

OTHER PUBLICATIONS

The Business and Technology Daily News, Mar. 2, 1994. (no translation).

*Primary Examiner*—Bruce F. Bell
*Assistant Examiner*—Brendan Mee
*Attorney, Agent, or Firm*—Oblon, Spivak, McClelland, Maier & Neustadt, P.C.

[57] ABSTRACT

Disclosed herein is a technique of removing metal contained in a solution through chelation, which makes it possible to preclude undesired aggregation and permit effective aggregation through an aggregating process. A surface active agent containing a hydrophobic group, a hydrophilic group and a chelating group is added to the solution to be processed, and subsequently an aggregating process is carried out. The chelating group chelates metal, the hydrophilic group prevents undesired aggregation, and the hydrophobic group is effectively aggregated in the aggregating process. Various uses are possible by selecting the charge of ligand.

4 Claims, 9 Drawing Sheets

TYPE A-1

A-1-1  $R_1 = -CH_2-CHR_2-OH$   ($R_2 = H$ or $-CH_3$)
A-1-2  $R_1 = -C(-CH_2-OH)_3$
A-1-3  $R_1 = -C(-CH_2-OH)_2-CH_3$
A-1-4  $R_1 = -CH_2-CH(-CH_2-N(-CH_2-CH_2-OH)_2)-OH$
A-1-5  $R_1 = -CH_2-COOH$

TYPE A-2

A-2-1  $R_1 = -CH_2-CH_2-CO-NH_2$
A-2-2  $R_1 = -CH_2-CHR_2-OH$   ($R_2 = H$ or $-CH_3$)
A-2-3  $R_1 = -CH_2-COOH$

TYPE A-3

A-3-1  $R_1 = H$
A-3-2  $R_1 = -CH_2-COOH$

TYPE B-1

(n = 2 or 3, $R_3$ = H or $-CH_3$)

B-1-1   $R_1 = R_2 = H$

B-1-2   $R_1 = R_2 = -CH_2-CHR_3-OH$   ($R_3$ = H or $-CH_3$)

B-1-3   $R_1 = -CH_2-COOH$; $R_2 = -CH_2-CHR_3-OH$ ($R_3$ = H or $-CH_3$)

TYPE B-2

B-2-1   $R_1 = R_2 = H$

B-2-2   $R_1 = H$; $R_2 = -CH_2-CH_2-CO-NH_2$

B-2-3   $R_1 = R_2 = -CH_2-CH_2-CO-NH_2$

B-2-4   $R_1 = R_2 = -CH_2-CHR_3-OH$   ($R_3$ = H or $-CH_3$)

B-2-5   $R_1 = R_2 = -CH_2-COOH$

TYPE B-3

(n = 2 or 3)

B-3-1   $R_1 = R_2 = H$

B-3-2   $R_1 = H$; $R_2 = -CH_2-COOH$

B-3-3   $R_1 = R_2 = -CH_2-COOH$

TYPE C-1

C-1-1  $R_1 = R_2 = R_3 = H$
C-1-2  $R_1 = R_2 = R_3 = -CH_2 - CHR_4 - OH$ ($R_4 = H$ or $-CH_3$)
C-1-3  $R_1 = R_2 = R_3 = -CH_2 - COOH$

TYPE C-2

C-2-1  $R_1 = R_2 = R_3 = H$
C-2-2  $R_1 = R_2 = H$; $R_3 = -CH_2 - CH_2 - CO - NH_2$
C-2-3  $R_1 = R_2 = R_3 = -CH_2 - CHR_4 - OH$ ($R_4 = H$ or $-CH_3$)
C-2-4  $R_1 = R_2 = R_3 = -CH_2 - COOH$

TYPE C-3

C-3-1  $R_1 = R_2 = R_3 = H$
C-3-2  $R_1 = R_2 = H$; $R_3 = -CH_2 - COOH$
C-3-3  $R_1 = R_2 = R_3 = -CH_2 - COOH$

TYPE E-1

E-1-1  $R_1 = -CH_2-CHR_2-OH$ ($R_2 = H$ or $-CH_3$)
E-1-2  $R_1 = -CH_2-COOH$

TYPE E-2

E-2-1  $R_1 = -CH_2-CH_2-CO-NH_2$
E-2-2  $R_1 = -CH_2-CHR_2-OH$ ($R_2 = H$ or $-CH_3$)
E-2-3  $R_1 = -CH_2-COOH$

TYPE E-3

E-3-1  $R_1 = H$
E-3-2  $R_1 = -CH_2-COOH$

TYPE D-1

D-1-1   $R_1 = H$
D-1-2   $R_1 = -CH_2-CHR-OH$  ($R_2 = H$ or $-CH_3$)
D-1-3   $R_1 = -CH_2-COOH$

TYPE D-2

D-2-1   $R_1 = H$
D-2-2   $R_1 = -CH_2-CHR_2-OH$  ($R_2 = H$ or $-CH_3$)
D-2-3   $R_1 = -CH_2-CH_2-CO-NH_2$
D-2-4   $R_1 = -CH_2-COOH$

TYPE D-3

D-3-1   $R_1 = H$
D-3-2   $R_1 = -CH_2-COOH$

METHOD OF REMOVING METAL CONTAINED IN SOLUTION

BACKGROUND OF THE INVENTION

1. Field of the Invention

This invention relates to a technique of removing metal contained in a solution and, more specifically, it provides a method of and an apparatus for removing metal as well as a surface active agent (surfactant) having chelating ability and used suitably for such method and apparatus. In addition, this invention relates to a technique of separating the removed metal from the solution. Here, the term "removal of metal from a solution" refers to "chelation of metal" and does not necessarily refer to "separation of metal from a solution".

2. Description of the Prior Art

Japanese Laid-Open Patent Publication No. 2-274900 discloses a process of separating metal ions from a solution. This technique employs a chelating agent which chelates metal ions to generate insoluble matter in the solution. More specifically, in this technique, the chelating agent noted above is added to the solution containing metal ions, followed by filtering out the insoluble matter to separate metal ions from the solution. The chelating agent used here does not contain any hydrophilic group because it is necessary to generate insoluble matter after chelating metal ions.

The technique in which the chelating agent free from hydrophilic group is used to chelate metal ions and generate insoluble matter, thereby separating metal ions from the solution, has the following problems. One of the problems is that the insoluble matter that is generated by the chelating agent is usually very fine in grain size and is difficult to be filtered out. Another problem is posed when re-using the solution. That is, during re-use of the solution which contains chelating agent added excessively for metal removal, insoluble matter is generated. For example, during washing of a plated product, metal ions are dissolved in the washing solution. If this washing solution is re-used without any processing, the metal ions therein are attached to a plated product. For this reason, it is necessary to recover the washing solution and remove metal ions therein. At this time, it is difficult to add an amount of chelating agent which is neither excessive nor insufficient with respect to the amount of metal ions in the solution. In the case of the Japanese Laid-Open Patent Publication No. 2-274900 noted above, it is recommended to add double the theoretically necessary amount of the chelating agent to increase the metal ion capturing factor. In such case, it is inevitable that ligands which do not chelate metal ions remain in the washing solution supplied for re-use. Consequently, metal ions dissolved in the washing solution are progressively chelated by ligands which have not chelated metal ions, thus resulting in the generation of insoluble matter during the washing.

SUMMARY OF THE INVENTION

The present invention seeks to create a technique which does not lead to aggregation through mere chelate removal of metal but leads to effective aggregation by carrying out a separate processing for aggregation, thus solving the problems inherent in the prior art.

According to the invention, a chelating agent is used. The chelating agent, however, contains a hydrophilic group so that it is not aggregated through mere chelation of metal. In addition, it contains a hydrophobic group so that it can be effectively aggregated through an aggregating process. Some surface active agents (surfactants) which contain a hydrophilic group, a hydrophobic group and a chelating group, are known in the art. However, the known surface active agents are mostly used as dispersing agent but are not used for removing metal contained in solution.

According to the invention, a surface active agent (surfactant) containing a hydrophilic group, a hydrophobic group and a chelating group, is added to a metal-containing solution to be processed. As a result, metal contained in the solution is chelated or removed by the chelating group. However, since the surface active agent contains the hydrophilic group, no precipitate is generated through mere chelation of metal. If the amount of surface active agent used is exceeding the micelle limit, micelles are formed in the solution. However, such micelles are not precipitated. Thus, mere dissolution of metal in the solution excessively containing surface active agent does not lead to precipitate generation.

The surface active agent which contains the hydrophilic group, the hydrophobic group and the chelating group having chelated metal, forms micelles with the hydrophobic group inside, but no precipitate is generated. However, when an electric field is applied to this solution, the micelles therein are aggregated to grow into a large mass. Other processes for aggregation may be adopted.

According to a method of the invention, in a first step, a surface active agent (surfactant) containing a hydrophilic group, a hydrophobic group and a chelating group, is added to a metal-containing solution, so that the surface active agent forms micelles with the hydrophobic group inside and at the same time captures metal with the chelating group on the micelle particle surface. As this occurs, the metal is removed substantially from the solution. In a second step, an electric field is applied to the solution, so that micelles are aggregated into a large mass. The large mass of micelles thus formed is separated, so that the metal can be separated effectively from the solution.

This technique is applicable as well to the removal of metal ions from an aqueous solution in which oil is emulsified, for instance, an aqueous cutting oil in which mineral oil is emulsified. Unless the metal ions are removed, the surface active agent effective to emulsify the oil tends to be deteriorated and eventually separated into water and oil. In this case, a surface active agent containing a hydrophilic group, a hydrophobic group and a chelating group is selected for emulsifying oil, the chelating group of which has a ligand with a negative electric charge not in just canceling relation to the positive electric charge of metal ions to be chelated. When oil has been emulsified by the surface active agent containing the chelating group having the electric property as noted above, metal ions dissolved in the aqueous solution can be effectively captured by the chelating group and removed from the aqueous solution. Since at this time, the chelating group which is dissociated in the solution has a negative electric charge not in just canceling relation to the positive electric charge of metal ions, electric charge remains in the chelating group after capturing the metal. The emulsion particles which are formed by the surface active agent dispersing oil and oil particles are thus charged and electrically repel one another without being aggregated, so that they exist in a stable state in the solution. Thus, according to the invention, it is possible to remove metal ions from the aqueous solution without spoiling the emulsified state of oil. It will be noted that the solution of which the metal is removed and the removed metal can be separated by a separate process.

To effectively separate metal from a solution without aggregation through mere removing of metal while permitting effective aggregation through an aggregating process, a surface active agent is suitably used, which contains a hydrophilic group, a hydrophobic group and a chelating group, and in which the chelating group contains a ligand with a negative electric charge in just canceling relation to the positive electric charge of metal ions to be chelated. With this surface active agent, the chelating group becomes electrically neutral when metal ions are captured, thus permitting very efficient aggregation through a subsequent aggregating process. Even with the chelating group becoming electrically neutral as a result of metal ion capturing, aggregation is not readily caused by the hydrophilic group, that is, undesired aggregation does not occur during use of the solution. As described before, there are some known surface active agents which contain the hydrophilic group, the hydrophobic group and the chelating group (their purpose being not for metal removal). However, the surface active agent containing a ligand with a negative electric charge in just canceling relation to the positive electric charge of metal ions to be chelated is provided as creation according to the invention. The electric charge of many kinds of metal ions are two-valent or above, while the electric charge of the prior art surface active agents have been limited to be uni-valent. The surface active agent according to the invention features that the electric charge is two-valent or above.

When a solution contains metal such as Cu, Pb, Ag and Hg, in order to remove such metal from the solution, it is preferable to use a surface active agent (surfactant) which comprises a hydrophilic group, a hydrophobic group and a chelating group, the chelating group containing a ligand in which sulfur atom is a coordinate atom. The surface active agent can also be used for emulsifying oil in an aqueous solution.

When the coordinate atom is sulfur atom, Cu, Pb, Ag or Hg is effectively chelated and removed from the solution, while Fe or Al is hardly chelated. For this reason, of metals, Cu, Pb, Ag and Hg can selectively be chelated. Thus, this technique is effective when there is less need to remove Fe or Al and substantial need to remove Cu, Pb, Ag or Hg.

Further, the invention provides a surface active agent which contains a hydrophobic group, an ethylene oxide group bonded to the end of the hydrophobic group, and a chelating group containing a multiple seat ligand bonded to the ethylene oxide group. This surface active agent has a hydrophilic group which is strongly hydrophilic owing to the ethylene oxide group, and aggregation does not readily result from mere chelation of metal. Thus, when metal ions are dissolved in re-used solution with the surface active agent excessively added thereto, it is possible to permit capturing of the metal without any aggregation. Thus, the intrinsic property of the solution is not spoiled.

BRIEF DESCRIPTION OF THE DRAWINGS

The above objects, features and advantages of the invention will become more apparent from the following detailed description of the preferred embodiment when the same is read with reference to the accompanying drawings, in which.

DETAILED DESCRIPTION OF THE PREFERRED EMBODIMENT

Examples of Suitable Surface Active Agent

Type 1: Charge neutralizing type

Figure 6:
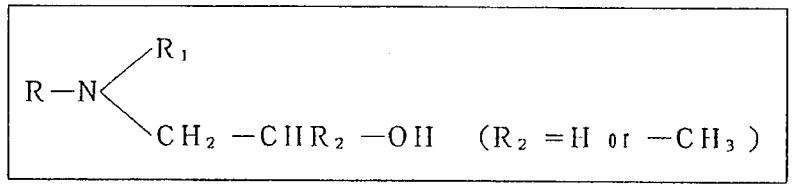
FIG. 6 is a view showing an example of chemical structure of a surface active agent containing a hydrophilic group, a hydrophobic group and a chelating group.
Figure 6:
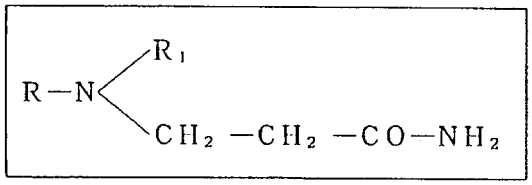
Figure 6:
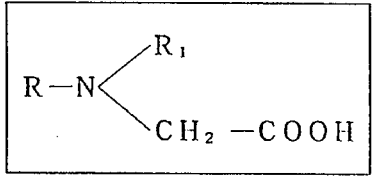
Figure 7:
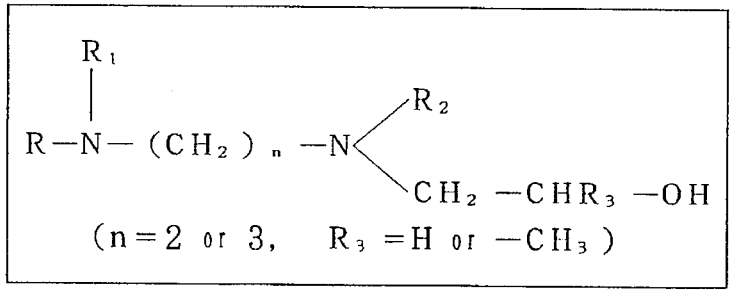
FIG. 7 is a view showing a different example of chemical structure of a surface active agent containing a hydrophilic group, a hydrophobic group and a chelating group.
Figure 7:
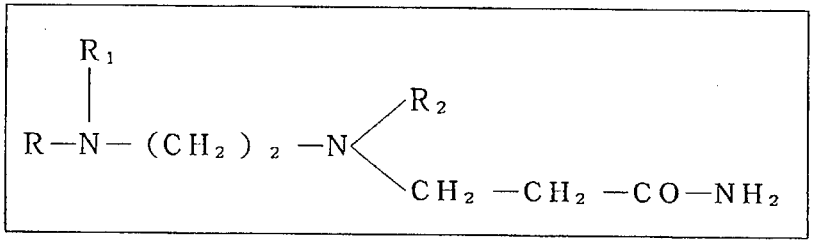
Figure 7:
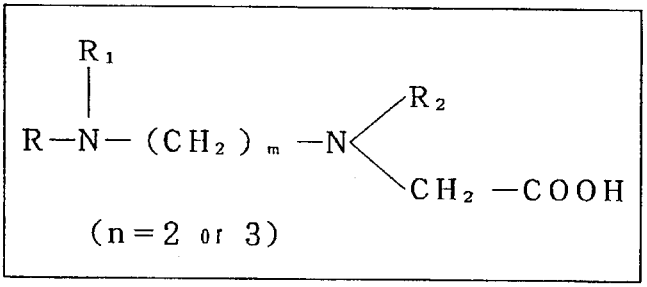
Figure 9:
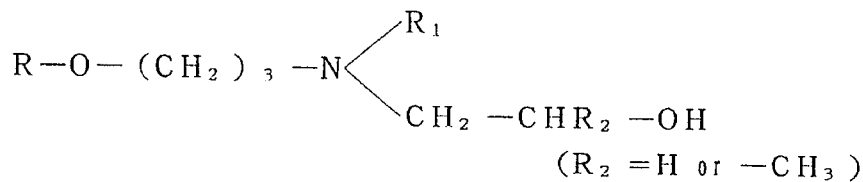
FIG. 9 is a view showing a still further example of chemical structure of a surface active agent containing a hydrophilic group, a hydrophobic group and a chelating group.
Figure 9:
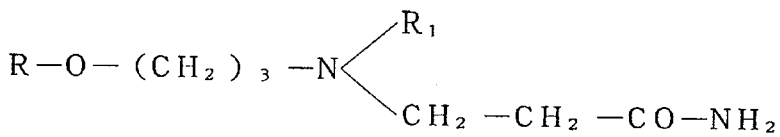
Figure 9:
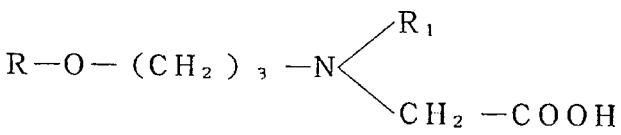

This type of surface active agent is used suitably when importance is attached to effective aggregation in an aggregating process. The surface active agent has a ligand with a negative electric charge in just canceling relation to the positive electric charge of metal ions to be chelated. The surface active agent is obtained by substituting a member of the group consisting of hydroxyethyl (—$CH_2$—$CH_2$—OH), carbamylethyl (—CH—$CH_2$—CO—$NH_2$), and carboxymethyl (—$CH_2$—COOH) with or without a bonded alkylamino group, the substituent corresponding in number to the valence of electric charge of metal ions to be chelated for one amino nitrogen atom at the end of a long chain alkyl amino group R with a carbon number of 8 to 30 or two amino nitrogen atoms spaced apart by ethane or propane. Examples of this type of surface active agent are shown in FIGS. 6 and 7. Examples of a similar surface active agent are shown in FIG. 9.

Figure 8:
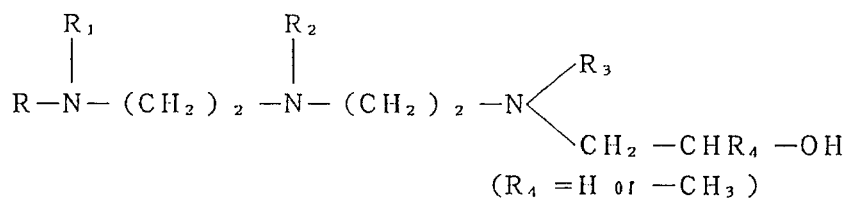
FIG. 8 is a view showing a further example of chemical structure of a surface active agent containing a hydrophilic group, a hydrophobic group and a chelating group.
Figure 8:
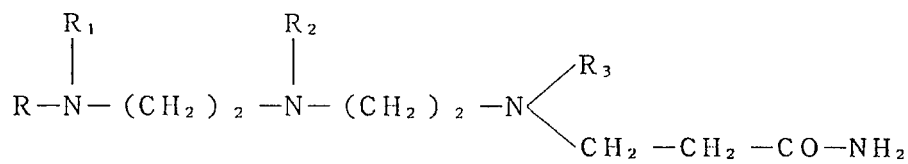
Figure 8:
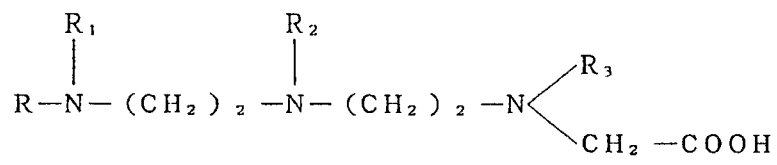

For example, when all the metal ions contained in a solution are two-valent (such as $Cu^{++}$, $Ni^{++}$ and $Zn^{++}$), a surface active agent is used, which is obtained by substituting two chelating groups noted above for one or two amino nitrogen atoms at the end of the long chain alkyl group R. When all the metal ions contained in a solution are three-valent (such as $Al^{+++}$, $Cr^{+++}$ and $Fe^{+++}$), a surface active agent is used, which is obtained by substituting three chelating groups for two amino nitrogen atoms. In this case, the chelating groups to be substituted for amino nitrogen may be of the same kind or of different kinds and are to be selected in dependence of the character of the solution to be processed. It is further possible to substitute four chelating groups. Such an example is shown in FIG. 8.

The prior art surface active agents containing the chelating group have a ligand with negative electric charge with single valence. Therefore, they are charged positively when they chelate two- or three-valent metal ions, that is, neutralization of charge is not obtained.

The surface active agent of the type of this example is designed to avoid mutual electric repulsion of emulsion particles even with chelate formation and at the same time, to permit effective aggregation only through an aggregating process.

This type of surface active agent tends to be readily aggregated and separated after metal is removed from the solution. Thus, the surface active agent, when added to an oil removal bath of oil separation type, forms stable chelate with metal in the bath to be shifted to the floated oil layer. Metal thus can be separated with mechanical separation of the oil layer.

Type 2: Strongly hydrophilic type

Figure 10:
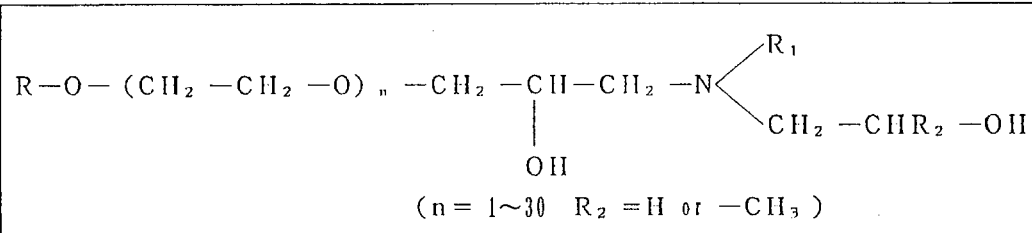
FIG. 10 is a view showing a still further example of chemical structure of a surface active agent with improved hydrophilic power.
Figure 10:
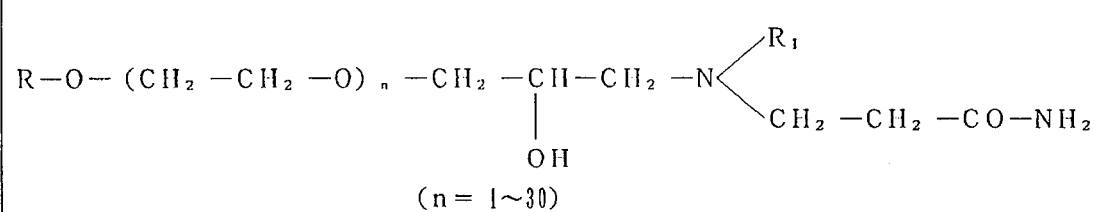
Figure 10:
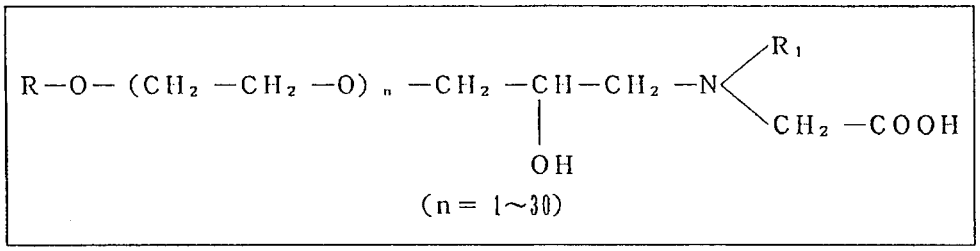

This type of surface active agent comprises an hydrophobic group such as higher alcohol and long chain alkylphenol, an ethylene oxide group bonded to the hydroxyl group (the end of the hydrophobic group) and a chelating group having a multiple seat ligand coupled to the end of the ethylene oxide group. The chelating group is suitably a member of the group consisting of hydroxyethyl, carbamylethyl and carboxymethyl as noted above with or without bonded alkylamino nitrogen. An example of this type of surface active agent is shown in FIG. 10.

This type of surface active agent is strongly hydrophilic owing to the ethylene oxide group, and no aggregation is brought about as a result of mere capturing of metal by its chelating group. However, it is possible to attain the aim of aggregation through an aggregating process in which an electric field is applied.

This type of surface active agent is effective as softening agent (sealing agent such as $Ca^{++}$, $Mg^{++}$, $Fe^{++}$, $Fe^{+++}$ and $Al^{+++}$) for general fat removal bath. Almost all fat removal baths are alkaline baths in which introduced metal ions are present as oxides or hydroxides and may be re-attached to the surface of the object being washed. At present, to prevent this, the introduced metal is made soluble using EDTA or like agents. This, however, poses a problem of non-precipitation of metal when the solution is processed for drainage from the bath. The surface active agent of the type in this case seals the harmful metal with strong chelating force. The removed or chelated metal may be separated by a charging process.

Further, the instant surface active agent is suited for removing metals (such as ions, oxides and hydroxides) in water washing baths of plating or coating solutions. In the existing precipitating process using a chelating agent (shown in Japanese Laid-Open Patent Publication No. 2-274900), there are harms of chelating agent present in the solution. This problem can be solved by using the instant surface active agent. That is, not only the surface active agent but also the generated chelate of metal are present as emulsion (i.e., hydrophilic colloid). Thus, re-attachment of the precipitate to the surface of the object being washed does not take place, and the metal-containing emulsion can be separated by the charging process. It is thus possible to realize continuous use of the water washing bath.

Type 3: Emulsion stabilizing type

This type of surface active agent is used effectively for removing metals (such as ions, hydroxides and oxides) present in aqueous solutions in which oil is emulsified without spoiling the emulsified state of the oil. As an example, when an aqueous cutting agent is used to cut metal, an oxide, a hydroxide or ions of the metal is increased considerably in the solution. In this case, an anionic surface active agent which is supporting the oil emulsification forms an insoluble salt with the compound of the metal and is eventually deteriorated. By using the instant type of surface active agent, chelation and emulsification are brought about prior to the formation of an insoluble salt by the harmful metal compound with the emulsion-supporting surface active agent, thereby maintaining the emulsified state of the oil. The metal-containing emulsion can be separated from the aqueous solution through a separate charging process of the aqueous solution. In this case, as the chelating group of the surface active agent used is selected those which contain a ligand with an electric charge not in just canceling relation to the positive electric charge of the metal ions.

The chelating group introduced into the surface active agent molecule, such as $-CH_2-COOH$, $-CH_2-CH_2-CO-NH_2$ and $-CH_2-CH_2-OH$ has variable chelate formation function in dependence on the character (acid, neutral, or alkaline) of the solution processed. Thus, this group has to be selected in dependence on use.

Type 4: Cu or Pb containing solution processing type

Figure 11:
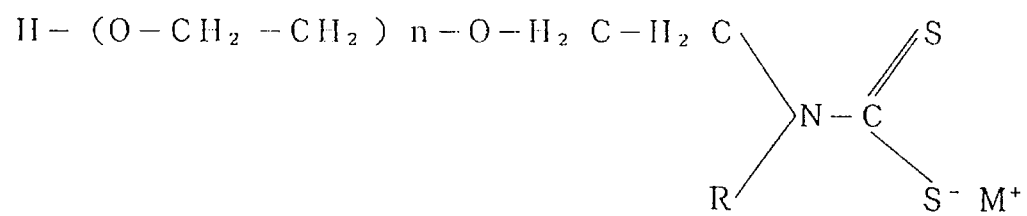
FIG. 11 is a view showing an example of a surface active agent in which sulfur atom is a coordinate atom.

This type of surface active agent comprises a hydrophilic group, a hydrophobic group and a chelating group, the chelating group containing a ligand in which sulfur atom is a coordinate atom. Examples of this type of surface active agent are shown in FIG. 11. In the drawings, R designates an alkaline group having 7 or more carbons. n is an integral number not less than 1. The ligand containing sulfur atom effectively chelate Cu, Pb, Ag or Hg. For this reason, the surface active agent is suitably used for processing washing solution of electrodeposition coated products containing much Cu or Pb. In a solution containing Fe, Al, Pb, Cu, Zn and other metals, there may exist less need to remove Fe and Al and substantial need to remove Pb, Cu, Zn and other metals. It will be noted that the chelating group of the surface active agent is less effective to capture Fe and Al For this reason, when this type of surface active agent is used in the case noted above, the chelating agent will not wastefully be consumed for Fe and Al of which need for removal is less, thus making it possible to use minimum chelating agent as required.

Embodiment Concerning Water Generation System

Figure 1:
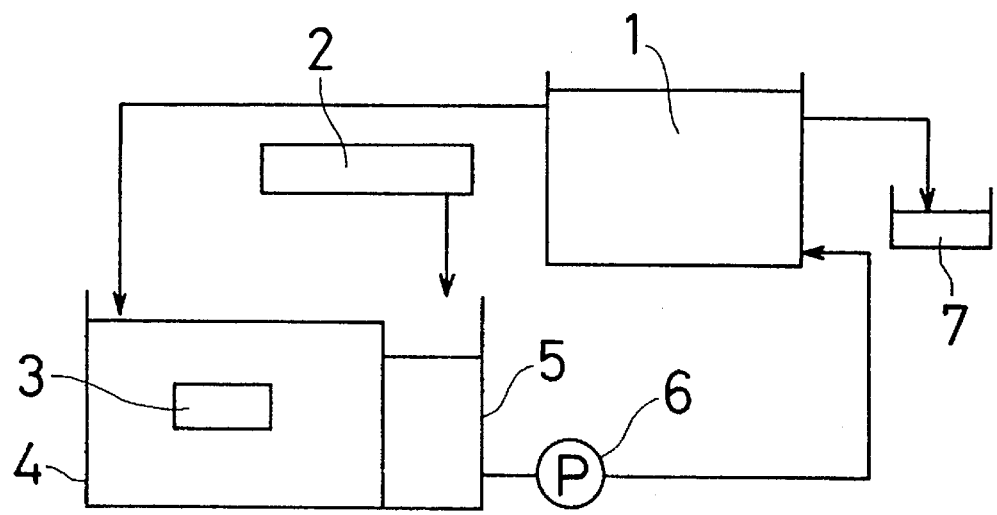
FIG. 1 is a view showing an embodiment of the invention applied to a liquid regenerating system.

An embodiment of the invention applied to a system for washing a plated product 3 is shown in FIG. 1. The plated product 3 requires washing, and is washed in a washing tank 4. Washing solution overflowing from the washing tank 4 is recovered in an overflow tank 5. Surface active agent having the chelating function as described above is added to the washing solution in the overflow tank 5 from surface active agent adding means 2.

The solution recovered in the overflow tank 5 is transferred by a pump 6 to a high frequency electric field aggregator/separator 1. In the high frequency electric field aggregator/separator 1, a high frequency electric field at 1 kHz or above is applied to the solution.

Figure 2:
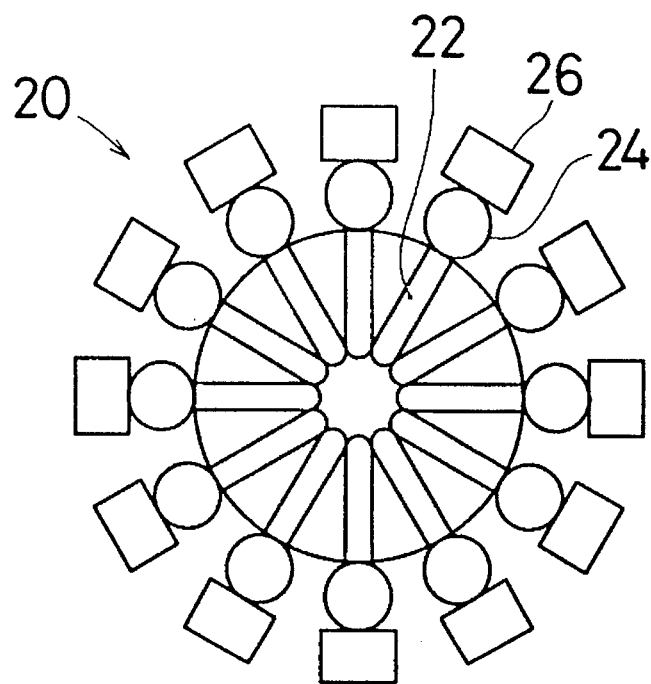
FIG. 2 is a schematic view showing a micelle.

While the plated product 3 is washed in the washing tank 4, metal ions are dissolved in the washing solution from the plated product 3. The dissolved metal ions are chelated by the added surface active agent having the chelating function. At this time, if the concentration of the metal ions is high, the hydrophobic groups of the surface active agent having chelated metal ions are bonded together to form micelles 20 as schematically shown in FIG. 2. Designated at 22 in FIG. 2 are hydrophobic groups, at 24 hydrophilic groups, and at 26 chelating groups after chelation of metal. The micelles 20 are very fine. Nevertheless, they are not precipitated in the overflow tank 5 because of their high hydrophilicity owing to the hydrophilic groups 24. Further, they are not precipitated in the washing tank 4 even when the plated product 3 is washed with excessive chelating agent added to the washing solution.

Figure 3:
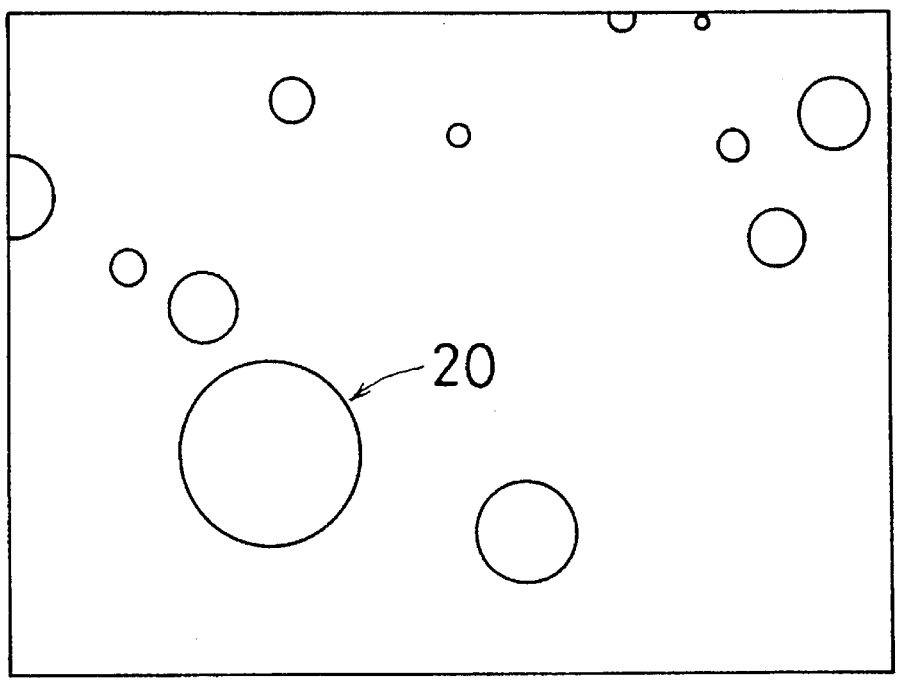
FIG. 3 is a view showing micelles before aggregation.
Figure 4:
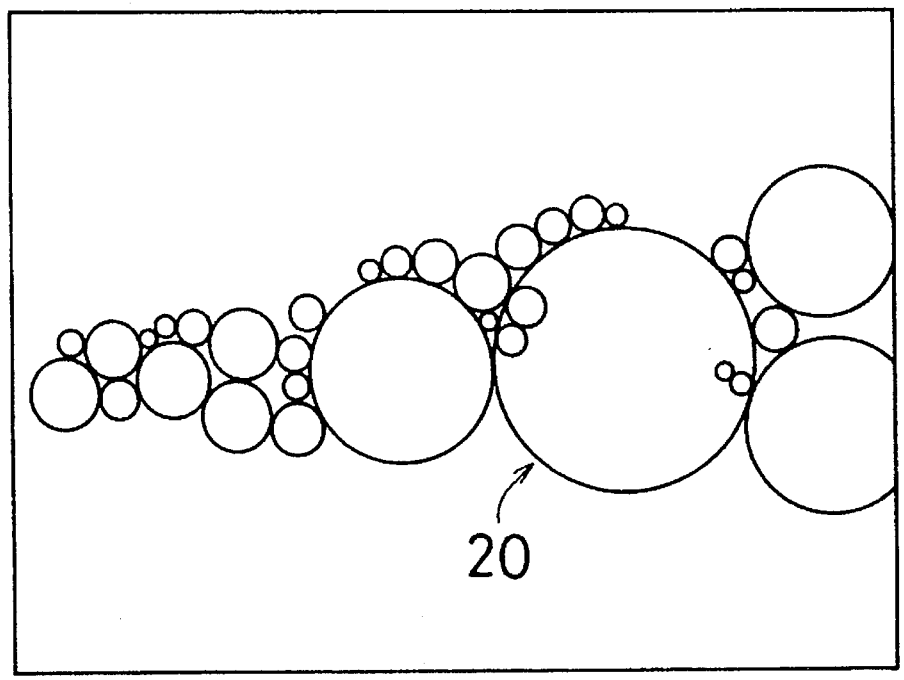
FIG. 4 is a view showing micelles after aggregation.

The washing solution and the surface active agent are agitated by the pump 6 for efficiently chelating metal ions, and the resultant mixture is supplied to the aggregator/separator 1 in the state that micelles have been formed by the bonding of hydrophobic groups. The result of microscopic observation of this solution in this state is shown in FIG. 3. Micelles 20 in the solution are vibrated finely in the high frequency electric field set up in the aggregator/separator 1. As a result of the vibrations, the micelles 20 are aggregated. The result of microscopic observation after the aggregation is shown in FIG. 4. The aggregate resulting from the aggregation of micelles is floated to the surface of the solution to be recovered in a recovery tank. After the recovery of the aggregate, the washing solution from which metal ions have been separated is returned to the washing tank 4.

Figure 5:
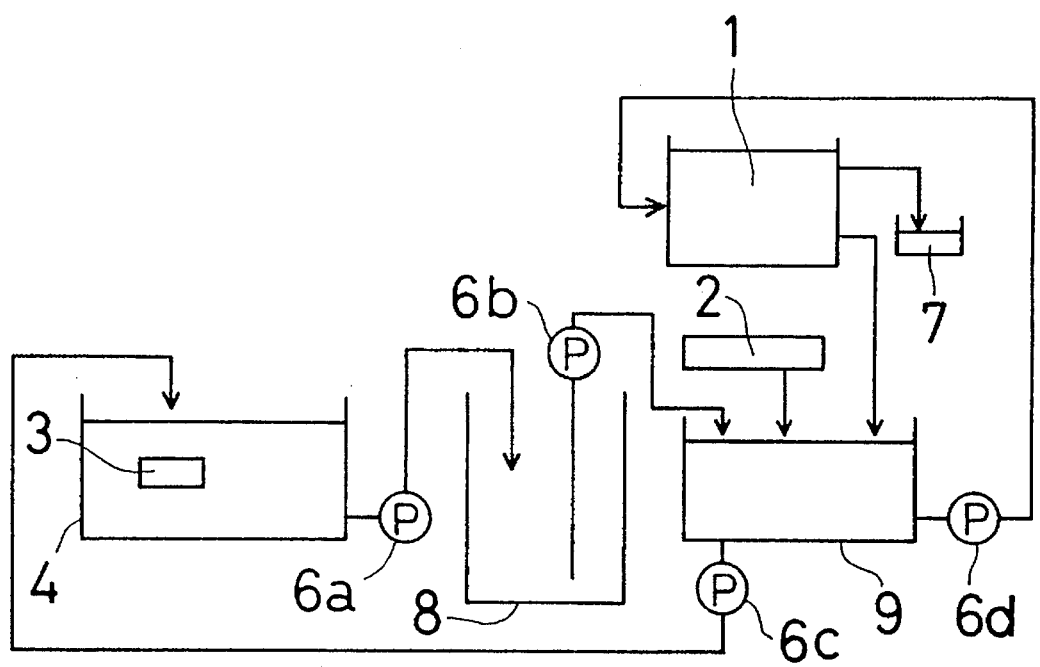
FIG. 5 is a view showing a different embodiment of the invention applied to a liquid regenerating system.

The washing solution regenerating process may be carried out as batch process as shown in FIG. 5. In this case, when the metal ion concentration in the washing solution has been increased, the solution is transferred by a pump 6a to an intermediate set tank 8. Then, the processed washing solution is supplied by a pump 6c from a surface active agent adding tank 9 to a washing tank 4 to continue the washing process. When the processed washing solution is transferred from the tank 9, washing solution having high metal ion concentration is transferred by a pump 6b to the tank 9 to be processed in the tank 9.

In the process, first the surface active agent having the chelating function is added from the surface active agent adding means 2 to the solution. The resultant mixture is then supplied by a pump 6d to the aggregator/separator 1, and aggregated surface active agent having chelated metal ions is recovered in a recovery tank 7. From this solution, metal ions are separated. After the removal of metal ions, the solution is returned to the tank 9. In this way, with increase of the metal ion concentration of the washing solution in the washing tank 4, the solution is renewed, and this operation is repeated.

The high frequency electric field aggregator/separator 1 includes a tank and at least one pair of electrode plates secured to the inner walls of the tank, a high frequency voltage being applied between the electrode plates. While this embodiment is applied to the processing of washing solution, the invention is also applicable to the processing of plating solution, water-soluble cutting oil, etc.

As has been described in the foregoing, with the metal removal technique according to the invention, metal is removed from a solution by using a surface active agent which has a chelating group for capturing metal, a hydrophilic group serving to prevent precipitation as a result of mere capturing of metal, and a hydrophobic group for providing for effective aggregation in an aggregating process. It is thus possible to obtain effective metal removal while maintaining the intrinsic property of the solution without being spoiled. Besides, when the solution is put through a special separating process, the solution of which metal is removed and the removed metal can be readily separated.

In addition, when the surface active agent with chelating function used according to the invention has a negative electric charge not in just canceling relation to the positive electric charge of metal ions to be chelated, it is possible to obtain effective metal removal without spoiling emulsion property of oil drops.

Further, a surface active agent which has a negative electric charge in just canceling relation to the positive electric charge of metal ions to be chelated, can be effectively aggregated after chelating metal, thus obtaining improved aggregating and separating functions.

Furthermore, the use of the surface active agent containing ion atom as a ligand makes it possible to effectively remove metal such as Cu, Pb, Ag and Hg.

Moreover, a surface active agent making use of the ethylene oxide group has a strongly hydrophilic group and is not aggregated unless an aggregating process is carried out. It is thus possible to prevent undesired aggregation.

What is claimed is:

1. A method of separating metal from a metal-containing solution, comprising the steps of:

adding a surface active agent containing a hydrophilic group, a hydrophobic group and a chelating group to a metal-containing solution;

applying an electric field to the mixture solution containing the surface active agent obtained in the preceding step; and separating an aggregate from the solution in which the surface active agent having chelated metal has been aggregated in the preceding two steps.

2. The method according to claim 1, wherein the surface active agent contains a ligand with a negative electric charge equal to a positive electric charge of metal ion to be chelated.

3. The method according to claim 1, wherein the surface active agent contains a hydrophobic group, an ethylene oxide group bonded to the end of the hydrophobic group and a chelating group having a multiple seat ligand bonded to the end of the ethylene oxide group.

4. The method according to claim 1, wherein the surface active agent contains a ligand in which sulfur atom is a coordinate atom.

* * * * *